Figures 1, 2:
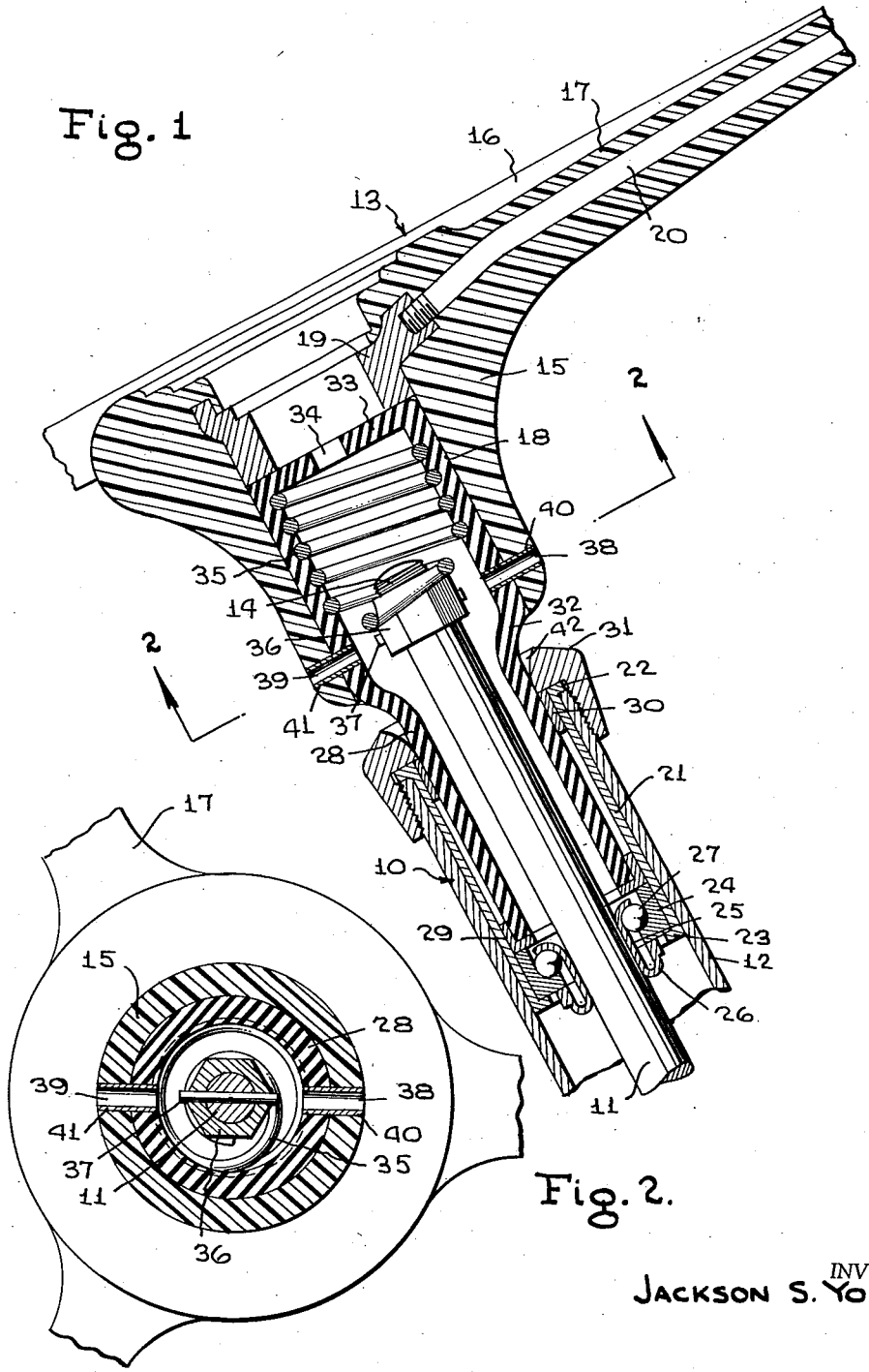

Jan. 1, 1952 J. S. YOHN 2,580,986
FLEXIBLE STEERING WHEEL MOUNTING
Filed Aug. 17, 1951

INVENTOR
JACKSON S. YOHN

BY
McMorrow, Berman & Davidson
ATTORNEYS

Patented Jan. 1, 1952

2,580,986

UNITED STATES PATENT OFFICE 2,580,986

FLEXIBLE STEERING WHEEL MOUNTING

Jackson S. Yohn, Pottstown, Pa.

Application August 17, 1951, Serial No. 242,388

5 Claims. (Cl. 74—552)

This invention relates to flexible steering wheel mountings, and more particularly to a flexible mounting for supporting a steering wheel on the end of a steering column for resiliently resisted freedom of rotational, axial, lateral and tilting movement of the wheel relative to the steering column.

It is among the objects of the invention to provide an improved steering wheel mounting including a sleeve of elastic material connected between a steering wheel and a wheel-supporting steering column to mount the wheel on the column for resiliently resisted freedom of lateral, axial and tilting movement of the wheel relative to the column, and spring means connecting the wheel to the steering shaft or rod for resiliently resisted freedom of rotational movement of the wheel relative to the steering shaft; which substantially eliminates shock and vibration between the steering column and the steering wheel and minimizes the danger of injury to the driver by the steering wheel in the event of a collision; which does not interfere in any way with the normal operation of the steering wheel; and which is simple and durable in construction, economical to manufacture, and neat and attractive in appearance.

Other objects and advantages will become apparent from a consideration of the following description and the appended claims in conjunction with the accompanying drawing, wherein:

Figure 1 is a longitudinal, medial, cross-sectional view of a steering wheel, steering column and flexible mounting combination illustrative of the invention; and Figure 2 is a transverse cross-sectional view on the line 2—2 of Figure 1.

With continued reference to the drawing, the steering column, generally indicated at 10, includes a steering shaft 11 and a fixed tubular housing 12 of larger internal diameter than the external diameter of the shaft coaxially receiving the steering shaft and providing a support for the latter.

A steering wheel, generally indicated at 13, is disposed adjacent one end of the steering column 10 which will be the normally upper end of the steering column when the column and wheel are operatively mounted in an automotive vehicle, and the shaft 11 extends beyond the end of the housing 12 adjacent the steering wheel 13 and is provided on this end with an external screw-thread formation 14.

The steering wheel 13, as illustrated, is of a well known construction including moldable material molded onto a metal core to provide a hub 15, a circular rim 16 and spokes, as indicated at 17, extending between the hub and the rim. The hub is of elongated shape extending to one side of the plane of the center line of the rim and is hollow, being provided with a bore 18 extending coaxially therethrough. A metal hub inset 19 of annular shape is molded into the hub adjacent the end of the hub bore nearest the plane of the center line of the rim and metal spoke cores 20 are secured each at one end to the insert 19 and extend through the corresponding spokes to a rim core, not illustrated. The usual horn button is mounted on the hub at the end of the bore 18 adjacent the insert 19 and wires lead from this button to the vehicle horn and the source of electrical energy, such as a storage battery carried by the vehicle, in a manner well known to the art.

A metal liner 21 having an outside diameter substantially equal to the inside diameter of the housing 12 is received in the housing at the end of the latter adjacent the steering wheel, and this sleeve has at one end an outwardly directed annular flange 22 overlying the corresponding end of the housing 12 and has at its other end an inwardly directed annular flange 23 which circumspatially surrounds the steering shaft 11. An anti-friction ball bearing is mounted between the steering shaft and the steering column housing, and includes an outer bearing race 24 disposed in the sleeve 21 and bearing at one end against the inner side of the inwardly directed flange 23, an inner race 25 closely surrounding the shaft 11 and having at one end a beaded-over portion 26 bearing against the end of the outer race 24 adjacent the annular flange 23 on the liner 21. Bearing balls 27 are disposed between the outer race 24 and the inner race 26, and the inner race is flared outwardly at its other end to overlie the bearing balls, the arrangement being such that the inner race is firmly held in position relative to the outer race and the bearing balls are firmly held between the inner and outer races and the entire bearing is held against movement in one direction longitudinally of the shaft 11 by the inwardly directed flange 23 of the liner 21.

A mounting sleeve 28 of suitable elastic material, such as vulcanized rubber, is received at one end in the metal liner 21 contained in the corresponding end portion of the housing 12 and the portion of the bearing sleeve 28 received in the liner 21 has an outside diameter somewhat smaller than the inside diameter of the liner.

A bearing ring 29 of rectangular shape is mounted on and surrounds the end of the sleeve 28 disposed inwardly of the housing 12. One leg of the ring 29 bears against and is journaled in the liner 21, and the other leg of the ring 29 bears on the adjacent end of the outer race 24 of the anti-friction bearing disposed between the steering shaft 11 and the shaft housing 12. A bearing ring or bushing 30 surrounds the sleeve 28 at the outer end of the liner 21 and is journaled in the liner. The bearing rings 29 and 30 are firmly secured to the bearing sleeve 28 by suitable means, such as by being bonded or vulcanized to this sleeve, and are effective to journal the bearing sleeve 28 in the liner 21.

The housing 12 is provided at its end adjacent the steering wheel with an external screw-threaded formation, and a flanged nut 31 is threaded onto this end of the housing and has an inwardly directed flange which bears on the flange 22 of the liner 21 and on the outer end of the bearing bushing 30 and maintains the liner 21 in the housing against movement longitudinally of the latter by clamping the flange 22 of the liner 21 between itself and the adjacent end of the housing 12 and maintains the mounting sleeve 12 against movement longitudinally of the housing 12 by disposing the bearing rings 29 and 30 between the outer race 24 of the ball bearing and the flange of the nut.

At its other end the bearing sleeve 28 is received in the hub 15 of the steering wheel 13 with one end in abutment with the adjacent end of the hub insert 19 of the steering wheel.

In the arrangement illustrated the portion of the sleeve 28 received within the hub 15 of the steering wheel is of somewhat larger diameter than the portion of this bearing sleeve received in the liner 21, and a reducing shoulder or neck 32 is provided between the larger and smaller end portions of the bearing sleeve. The portion of the bearing sleeve received in the hub 15 is firmly secured in the hub by suitable means, such as by being bonded or vulcanized to the surface of the hub bore, and the bearing sleeve is provided at its larger end with an end wall 33 which reinforces the corresponding end of the bearing sleeve and is provided with an aperture 34 through which the wires may pass from the horn button or other control instrumentality mounted on the hub of the steering wheel.

A coiled torsion spring 35 is received in the larger end portion of the sleeve 28 and secured to the sleeve by suitable means, such as by being bonded or vulcanized thereto, and a nut 36 is threaded onto the screw-threaded end portion 14 of the steering shaft 11. The spring 35 is secured at its end adjacent the nut 36 to this nut, as by being brazed or welded to the nut, and the nut and the steering shaft 11 are provided with transversely extending apertures which register to receive a locking pin 37 which maintains the nut against turning movement relative to the steering shaft.

The steering wheel hub 15 and the hub-included portion of the sleeve 28 are transversely apertured at diametrically opposite locations around the hub and near the end of the hub adjacent the steering column 10, as indicated at 38 and 39, and tubular liners or grommets 40 and 41 extend through the registering apertures at the diametrically opposite sides of the hub and sleeve, so that the locking pin 37 can be passed through one of these grommets and inserted through the nut 36 and steering shaft 11, or can be removed from the nut and steering shaft and passed out of the hub through one of the grommets when it is desired to detach the steering wheel from the steering column.

The nut 31 is outwardly flared around the sleeve 28, as indicated at 42, to provide a limited freedom of bending of the sleeve 28 adjacent the neck portion 32 thereof.

With this arrangement, the sleeve 28 being bendable between the nut 31 and the adjacent end of the wheel hub 15, provides a limited freedom of resiliently resisted lateral and tilting movement of the wheel relative to the steering column, and being slightly compressible, provides a limited freedom of resiliently resisted movement of the steering wheel axially of the steering column. The spring 35 providing the only connection between the steering wheel and the steering shaft provides a limited freedom of resiliently resisted rotational or turning movement of the wheel relative to the steering shaft and also provides a flexible connection between the wheel and the steering shaft, so that the wheel can move slightly laterally, axially and pivotally of the steering column, as explained above.

While a sufficient degree of flexibility is provided between the steering wheel and the steering column to substantially eliminate shock and vibration between the steering column and the steering wheel and to prevent injury to a driver of the associated vehicle by the steering wheel in the event of a collision, the connection is still adequately strong and rigid to provide sensitive control of the steering of the associated vehicle by the steering wheel and to sustain the steering load imposed on the steering wheel with an adequate factor of safety.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a steering column including a steering shaft and a fixed tubular housing circumspatially receiving said shaft, and a steering wheel disposed adjacent one end of said steering column and having a hollow hub, a sleeve of elastic material having one end received in said housing at said one end of the steering column and its other end received in said hub and secured therein, bearing means interposed between said sleeve and said housing, means connected between said sleeve and said housing restraining said sleeve against movement longitudinally of said housing, a spring received in the portion of said sleeve received in said hub and secured to said sleeve, and means connecting said spring at one end to the adjacent end of said steering shaft.

2. In combination with a steering column including a steering shaft and a fixed tubular housing circumspatially receiving said shaft, and a steering wheel disposed adjacent one end of said steering column and having a hollow hub, a sleeve of elastic material having one end received in said housing at said one end of the steering column and its other end received in said hub and secured therein, bearing means interposed between said sleeve and said housing, means connected between said sleeve and said housing restraining said sleeve against movement longitudinally of said housing, a spring received in the portion of said sleeve received in said hub and secured to said sleeve, means connecting said spring at one end to the adjacent end of said steering shaft, and anti-friction bearing means disposed between said steering shaft and said housing at the end of said sleeve disposed inwardly of said housing.

3. In combination with a steering column including a fixed tubular housing and a steering shaft extending coaxially through said housing and spaced therefrom, and a steering wheel disposed adjacent one end of said steering column and including a hollow hub having a bore disposed substantially coaxially of said steering column, a flexible mounting supporting said wheel on said housing and drivingly connecting said wheel to said steering shaft comprising a sleeve of flexible material journaled at one end in said housing at said one end of the latter and received at its other end in said hub and secured thereto, a coiled torsion spring received in the portion of said sleeve received in said hub and secured in said sleeve, and means connecting one end of said spring to the adjacent end of said steering shaft.

4. In combination with a steering column including a fixed tubular housing and a steering shaft extending coaxially through said housing and spaced therefrom, and a steering wheel disposed adjacent one end of said steering column and including a hollow hub having a bore disposed substantially coaxially of said steering column, a flexible mounting supporting said wheel on said housing and drivingly connecting said wheel to said steering shaft comprising a liner secured in said housing at said one end of the latter and having an inwardly directed annular flange at its end remote from said one end of the housing, an anti-friction ball bearing disposed in said liner against said flange and receiving said steering shaft to journal the latter in said housing, a sleeve of elastic material journaled at one end in said liner and received at its other end in the bore of said hub and secured to the latter, a coiled torsion spring received in the portion of said sleeve received in said hub and secured to said sleeve, a nut secured to said spring at one end of the latter and threaded onto the adjacent end of said steering shaft, and means locking said nut to said steering shaft.

5. In combination with a steering column including a fixed tubular housing and a steering shaft extending coaxially through said housing and spaced therefrom, and a steering wheel disposed adjacent one end of said steering column and including a hollow hub having a bore disposed substantially coaxially of said steering column, a flexible mounting supporting said wheel on said housing and drivingly connecting said wheel to said steering shaft comprising a liner received in said housing at said one end of the latter and having at one end an outwardly directed annular flange overlying the corresponding end of said housing and at its other end an inwardly directed annular flange spaced from said one end of said housing, an anti-friction bearing disposed between said steering shaft and said liner and bearing at one end against said inwardly directed flange, a sleeve of elastic material received at one end in said liner and at its other end in said hub and secured to the latter, bearing rings on the portion of said sleeve disposed within said liner and disposed one at the end of said sleeve and in bearing engagement with said liner and the adjacent end of said anti-friction bearing and the other in bearing engagement with said sleeve adjacent said outwardly directed flange, an annular nut threaded onto the end of said housing and engaging said outwardly directed annular flange and the outer edge of said other bearing ring to secure said liner and said sleeve against movement longitudinally of said housing, a coiled torsion spring disposed in the portion of said sleeve received in said hub and secured to said sleeve, a nut secured to one end of said spring and threaded onto the adjacent end of said steeering shaft, said nut and said shaft having transversely extending apertures therein, and a pin extending through said apertures locking said nut on said shaft, said hub and said sleeve being apertured for the installation and removal of said pin.

JACKSON S. YOHN.

REFERENCES CITED

The following references are of record in the file of this patent:

UNITED STATES PATENTS

| Number | Name | Date |
|---|---|---|
| 400,536 | Bailey | Apr. 2, 1889 |
| 871,109 | Coates | Nov. 19, 1907 |
| 1,826,278 | Flanigan | Oct. 6, 1931 |
| 2,166,290 | Geyer | July 18, 1939 |